May 27, 1947.  A. M. CANDY  2,421,184
APPARATUS FOR ELECTRIC WELDING OF STUDS
Filed April 3, 1944
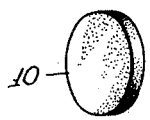
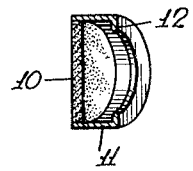
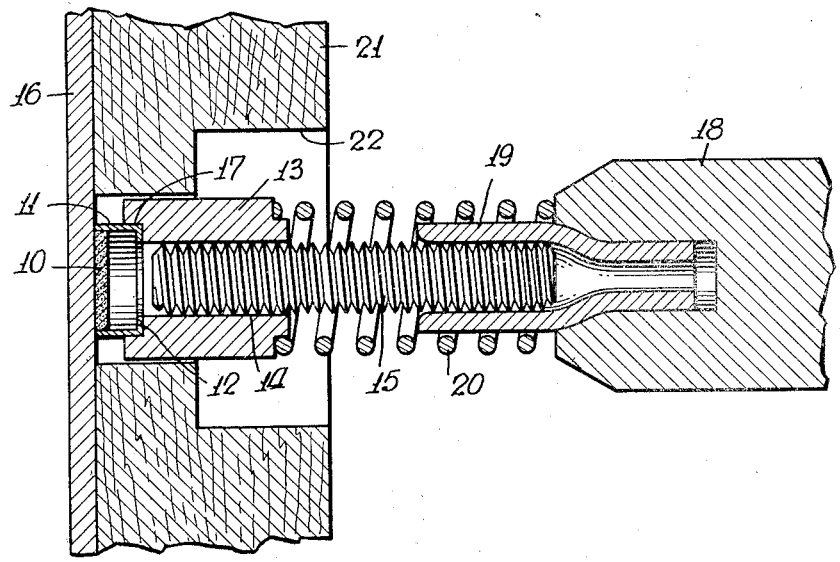
INVENTOR
Albert M. Candy
BY
Dean Fairbank & Hirsch
ATTORNEYS Patented May 27, 1947

2,421,184

UNITED STATES PATENT OFFICE 2,421,184

APPARATUS FOR ELECTRIC WELDING OF STUDS

Albert M. Candy, La Grange, Ill., assignor to Hollup Corporation, Chicago, Ill., a corporation of Illinois Application April 3, 1944, Serial No. 529,298

1 Claim. (Cl. 219—17)

This invention relates in part to the general type of construction shown in the Crecca and Bissell Patent 2,315,502 and in the Crecca reissue patent Re. 22,108. In the said Crecca reissue patent there is disclosed means for securing sheathing to a metal plate, the stud being adapted to receive a retainer for holding said sheathing in place on said plate. The sheathing is provided with an opening through which the stud is inserted prior to welding. A sleeve or ferrule of fire-resisting material is inserted in said opening before the insertion of the stud, so as to protect the sheathing from the action of the higher temperature produced in the welding. A small quantity of arc initiating material in granular form is placed on the plate within the ferrule, and the stud is initially held with the end spaced a short distance from the plate and in contact with the art initiating material, so that an arc may be formed between the end of the stud and the surface of the plate to heat the parts to the required welding temperature.

In practice the operator may not always put in the same amount of such arc initiating material, and may not always place the stud in contact with said material. Thus uniform operations and results are not always obtained. In welding the stud to the surface of a vertical plate, or to the under side of a horizontal or inclined plate, such powdered arc initiating material cannot be retained in the ferrule and against the plate while inserting the stud.

It has been proposed to incorporate the arc initiating material in the ferrule in the form of a disc, and to so form the ferrule that it may be carried by a part of the stud welding gun. It has also been proposed to employ a special form of stud in which the arc initiating material is retained in a socket in the end of the stud. Such constructions involve a substantial increase in the cost of the ferrules or the studs.

One object of the present invention is to avoid the objections above referred to, this being accomplished by incorporating the arc initiating material in a form-retaining disc which may be made of predetermined thickness. Thus the use of a uniform amount of arc initiating material is insured; the disc may be retained within the ferrule and against the plate, regardless of the inclination or position of the plate; and the disc may serve as a spacer and be clamped in place between the stud and the plate.

Preferably the disc is disposed in and forms a bottom wall for the ferrule, so that the operator only needs to drop the ferrule into the opening in the sheathing or slip it onto the end of the stud, if the welding is to be on the under side of the plate, and the stud may be then advanced to hold the disc and ferrule in place so that upon closing the circuit an arc will be formed.

A further object of the invention is to provide means on the stud welding gun for properly centering the ferrule and arc initiating material, and to yieldingly press and retain the ferrule in position during the welding operation.

In carrying out my invention I employ as an essential feature, a sleeve which is recessed to receive one end of the ferrule and thereby center it, and which is yieldingly pressed against the ferrule during the movement of the stud through the sleeve and ferrule into position for welding.

In the accompanying drawings:

Fig. 1 is a perspective view of a disc of arc initiating material.

Fig. 2 is a central longitudinal section through a ferrule having the disc forming an end wall thereof, and Fig. 3 is a section through the parts as they may be positioned preparatory to welding a stud to a plate.

The arc initiating material may include the same material disclosed in the Crecca reissue patent, namely a mixture of aluminum filings and iron filings, and may be mixed with any suitable adhesive or other binder and compressed in a suitable mold or die to form a disc 10 which may be of predetermined diameter and thickness. The diameter should be such as will permit it to be inserted within a ferrule 11 of fire-resistant material. Preferably, although not necessarily, the disc may be cemented into the ferrule and form a bottom wall thereof, as shown in Fig. 2. The opposite end of the ferrule may have an inturned flange 12 to center the ferrule in respect to the stud to be welded.

In my improved construction the welding gun includes a sleeve 13 of steel, insulating material, or of any other desired composition, and it preferably has a central passage 14 slightly larger than the stud 15, which is to be welded to the plate 16. The sleeve 13 has a recess or socket 17 in one end which will receive the end of the ferrule and hold it concentric with the stud. The inner end of the socket presents a shoulder against which the flat end of the ferrule abuts. The stud may be carried by an adapter 18 with a collet 19 for frictionally holding one end of the stud, and a spring 20 may encircle the stud and collet and have its ends engaging with the adapter 18 and the end of the sleeve 13. Thus, as the stud is moved endwise into engagement with the plate, the spring is compressed and the ferrule firmly held in place and properly centered.

A sheathing 21 may be placed on the plate 16 and provided with a stepped hole 22. The end of the stud welding gun, comprising the adapter, collet, spring and sleeve, has the stud inserted as shown in Fig. 3, and the ferrule with its disc is inserted in the socket of the sleeve, or if the plate be horizontal, the ferrule may be dropped into the hole in the sheathing. The adapter is pressed down to engage one surface of the disc 10 and press it against the plate 16, and the circuit is closed so that an arc is formed between the plate and the stud, and through the arc initiating material. The arc will heat the plate and the end of the stud to proper welding temperature, and the adapter is then forced down to a further extent and against the action of the spring 20 until the stud engages the plate and becomes welded thereto, and the parts are then removed from the hole in the plate. It is immaterial whether the ferrule be removed and discarded, or whether it be left in the hole as shown in the Crecca reissue patent. A suitable nut is placed on the outer end of the stud, and the outer end of the hole is plugged as shown in said reissue patent.

It will be noted that by means of the construction illustrated it is immaterial whether the plate be in a horizontal or vertical position, and if vertical or inclined, it is immaterial whether the stud be welded to the upper or under side, because the operation will in all cases be the same. The forming of the arc initiating material as a disc of predetermined size and proportions insures a uniform spacing of the stud from the plate at the time the circuit is formed, and insures the proper positioning of the arc initiating material regardless of the position of the plate to which the stud is to be welded.

The arc initiating material of the disc acts to conduct current between the stud and the plate, and it melts or fuses to permit the stud to be pushed firmly against the plate when the desired heating has been effected by the arc. The material also acts as a flux during the welding. The ferrule serves the double purpose of protecting the wood sheathing from the action of the welding heat, and acts as a carrier, retainer and positioning means for the disc of the arc initiating and flux material.

The term "form-retaining" is used herein to described the disc prior to the passage of the current therethrough because obviously it does not retain its form after being melted or fused.

It will be apparent that the invention may be employed for welding a stud to a plate or other metal part where the stud is for other purposes than for securing sheathing to said part.

Having thus described my invention, what I claim as new and desire to secure by Letters Patent is:

A stud welding apparatus of the type in which there is provided an adapter having a socket for detachably holding a stud and pressing it against the part to which it is to be welded, and for use in connection with a flat ended ferrule of heat-resistant material, said apparatus having a sleeve provided with a central passage through which the stud may move and on which stud said sleeve may slide, one end of said sleeve being recessed to provide a socket for receiving and centering said ferrule in respect to said stud, the inner end of said socket forming a shoulder for engaging one end of said ferrule, and a spring carried by and engaging said adapter and engaging the other end of said sleeve, whereby said sleeve presses said ferrule against said part during movement of the adapter and said stud toward said part and the compressing of said spring.

ALBERT M. CANDY.

REFERENCES CITED

The following references are of record in the file of this patent:

UNITED STATES PATENTS

| Number | Name | Date |
|---|---|---|
| 2,138,025 | Crecca et al. | Nov. 29, 1938 |
| 2,348,728 | Crecca | May 16, 1944 |
| 2,355,099 | Nelson | Aug. 8, 1944 |
| 2,315,502 | Crecca et al. | Apr. 6, 1943 |